Patented Mar. 21, 1939

2,151,432

UNITED STATES PATENT OFFICE 2,151,432

METHOD OF OPERATING INTERNAL COMBUSTION ENGINES

Willard E. Lyons and Leo J. McKone, Chicago, Ill., assignors to Leo Corporation, Chicago, Ill., a corporation of Illinois No Drawing. Application July 3, 1937, Serial No. 151,836

25 Claims. (Cl. 44—9)

This invention relates to a method of operating an internal combustion engine of either spark-ignition or compression-ignition type and more particularly to a method wherein a treated motor fuel is used to improve the efficiency of the combustion of the fuel mixture in the internal combustion engine.

This application is a continuation in part of our copending application Serial No. 90,387, filed July 13, 1936. The invention described in said copending application discloses a method of forming deposits of catalytic material in the combustion chamber of an internal combustion engine, and a method of augmenting, replacing and renewing said deposits, said method involving the dissolving of relatively small concentrations of the catalytic material in the engine fuel. More particularly said invention concerns the said use of catalytic material which enhances combustion of the fuel.

Any of said catalytic material which forms such catalytic deposits in the combustion chamber is susceptible to the method of use involved in said invention and for this purpose organic compounds of catalytic metals which are soluble in hydrocarbon motor fuels are satisfactory and preferred. Said copending application, Serial No. 90,387, describes one group of said catalytic materials and the present application describes another group of said catalytic materials which are also suitable and susceptible to the same method of use involved in said invention.

In accordance with our invention, the efficiency of combustion of base fuels in an internal combustion engine is greatly increased. This increase in efficiency is accomplished by compressing and burning a charge of the base fuel in the presence of relatively minute quantities of organo-metallic compounds and their residues as formed within the combustion chamber during the operation of the engine.

The base fuels that may be used in the method of our invention include gasolines, benzene, fuel oils, kerosene, alcohols, or blends or mixtures thereof. For the purposes of our invention, the base fuel used may be either a low compression motor fuel or one that possesses some anti-knock properties, either as a result of the method of its manufacture or because of the previous addition thereto of a volatile lead compound such as tetra ethyl lead. In either case the efficiency of combustion of the motor fuel is greatly improved if the fuel is compressed and burned in the presence of relatively minute quantities of the compounds which we use in the treatment of such base fuels, and in the presence of residues formed from such compounds. The improvement in combustion efficiency is manifested by an improved anti-knock performance of the engine, by increased mileage obtained from the base fuel in a given engine, by the permissible use of leaner mixtures, and by increased power output.

In carrying out our method, a base fuel such as above referred to is treated by dissolving in the fuel organic compounds of various metals which are capable under the conditions obtaining in the operation of an internal combustion engine prior to ignition of liberating the metals and/or forming metallic compounds in the air-fuel mixture which accelerate or activate chemical reactions in the combustion mixture and which, during the process of combustion, form residues that are deposited on surfaces of the combustion chamber and that are effective catalytically in increasing the efficiency of the fuel combustion. Organo-metallic compounds which are soluble in the motor fuel are preferred, but relatively insoluble compounds of metals may be dispersed in the fuel by means of mutual solvents or emulsifying agents.

The said group of suitable catalytic materials to which this present application pertains includes the organic compounds of selenium, antimony, arsenic, bismuth, cadmium, tellurium, thallium and tin, all of which are known in the art as compounds which provide anti-knock properties when added to the motor fuel of spark-ignition engines. Compounds of these metals dissolved in a motor fuel leave deposits of catalytic residues in the combustion chamber when the containing fuel is burned in the operation of the engine, and said compounds are suitable and useful for improving combustion when used in accordance with the method concerned in this invention.

This present application also includes the organic compounds of barium, boron, cesium, didymium, lanthanum, potassium, sodium, tantalum, titanium, tungsten and zinc, as suitable catalytic materials for improving combustion of the motor fuel in accordance with the method of this invention. This latter group of metals and their oxides, or carbonates, known in the art as catalysts for accelerating oxidation and combustion of hydrocarbons and their decomposition products, provide little or no anti-knock properties when introduced into a spark-ignition engine by dissolving compounds of the metals in the fuel. On the other hand, this latter group of metals and their oxides perform a very useful function when used in minor concentrations alone or in combination with said knock suppressing catalytic materials in spark-ignition engines, act as promotors of the desired catalytic reactions, provide a more complete combustion of the total fuel charge, improve the character of the carbon residue and reduce the amount of carbon residue in the cylinder. When used to improve the combustion of the fuel in engines of the compression-ignition or Diesel type, this latter group of catalytic materials may form the major part of the catalytic material embodied in the Diesel fuel to be used in accordance with the method of this invention. Improvement of combustion in a Diesel engine is related to reducing the ignition lag which occurs after injection of the fuel, thereby avoiding roughness of combustion, permitting lower compression ratios and lighter weight engines; accelerating the speed of the flame propagation, enabling the use of higher speed engines; and improving the character and amount of carbon residue, avoiding piston-ring sticking and loss of compression.

The organo-metallic compounds which we prefer to use are the beta diketone derivatives and their homologues, such as the metal acetylacetonates, propionylacetonates, formylacetonates, and the like. In general, however, we may use compounds of any of the foregoing metals and metalloids with the following organic acids or acid reacting compounds:

Naphthenic and paraffinic acids.
Mono alkyl esters of salicylic, phthalic, camphoric, malonic and other dicarboxylic organic acids.
Cresylic acid and other phenols.
Mercaptans.
Aceto acetic acid esters and their homologues.
Long chain saturated and unsaturated fatty acids.
Aryl carboxylic acids.

We have discovered a novel method of using the treated fuel in an internal combustion engine, whereby the amount of said organo-metallic compounds required to be used in each gallon of fuel is greatly decreased and a substantial reduction in the cost of the treated fuel is thereby realized.

It has heretofore been proposed, as in British Patent No. 287,192, to use metal compounds of the beta diketones in motor fuels for improving their anti-knock properties, in a manner similar to the use of tetra ethyl lead. In that patent, the amounts of the metallic compounds to be used have been sufficient, upon introduction of the initial charge of the treated fuel into the motor, to produce an immediate maximum anti-knock result. Similarly, where tetra ethyl lead has been used, the concentrations of tetra ethyl lead in the fuel have been sufficient, immediately upon the introduction of the tetra ethyl lead treated fuel into the motor, to produce anti-knock results. In the case of said British patent, from 0.1 to 1% of the metallic compounds by weight of the fuel is proposed.

We have now discovered that a catalytic residue results when the organo-metallic compounds are used in a motor fuel, whereby catalytically active material is deposited in the intake manifold, the intake ports and upon the walls and head of the combustion chamber exposed to combustion. The catalytic material includes inorganic forms, such as the metals and their oxides or carbonates. Such catalytic deposits, as determined by tests and actual runs which we have made, are in themselves as active and efficient for the elimination of knock and the improvement of combustion as are the metal compounds present in suspension in the air-fuel mixture.

For example, we have dissolved in a given low compression fuel the required amount of the organo-metallic compounds which would be necessary for immediate suppression of knock in a motor of a given car and then have run the car for ten miles. Thereupon, the same fuel, but without the organo-metallic compounds, was used in the same motor and the run continued. The immediate effect was the imparting to the fuel and its combustion of the same anti-knock value possessed by the treated fuel initially used. Thereafter, upon continued running with the untreated fuel, the anti-knock value gradually diminished until no anti-knock effect could be noted. This, we believe, was due to the fact that the catalytically active deposits were carried out of the motor or otherwise depleted during the continued running of the engine. At the end of said run, the intake manifold of the motor was removed and was replaced by a manifold in which deposits of said catalytically active material had accumulated by reason of the manifold having been used on a motor for several hundred miles during which a treated fuel had been employed. As a result of said catalytic deposits in the manifold, a substantial improvement in the anti-knock properties of the untreated fuel was noticed.

It is therefore an important object of this invention to provide a method of operating internal combustion engines that includes introducing into the air-fuel mixture taken into the intake of the engine relatively minute concentrations of organo-metallic compounds, such concentrations being insufficient in themselves to immediately impart anti-knock properties to the fuel with which said metal compounds are associated, but effective upon continued introduction of the treated fuel into the engine in building up a sufficient area of deposits of said metal compounds on the exposed surfaces of the combustion chamber, and induction passages, to result eventually in full catalytic activity, such as would be immediately present were the necessary greater amount of organo-metallic compounds initially incorporated into the fuel.

It is a further important object of this invention to provide a method of operating internal combustion engines wherein a sufficient quantity of organo-metallic compounds is incorporated into the base fuel to produce a concentration of such compounds that will result in a rapid buildup of the catalytically active deposits in the combustion chamber of the motor, and then subsequently introducing into the engine a fuel containing a substantially smaller concentration of the organo-metallic compounds, sufficient only to maintain the desired amount of catalytic deposits by renewal and replacement thereof.

Other and further important objects of this invention will become apparent from the following description and appended claims.

In accordance with our invention, from about 0.001 to 0.085% of an organo-metallic compound, or mixture of compounds, is incorporated in each gallon of base fuel. The term "base fuel" is meant to include gasoline, benzene, fuel oil, kerosene, alcohol, or blends thereof, or a fuel that has been treated with tetra ethyl lead or other volatile lead compound.

Metals and metalloids which form compounds having desired catalytic activity in increasing the efficiency of combustion of fuels in internal combustion engines are selenium, antimony, arsenic, bismuth, cadmium, tellurium, thallium, tin, barium, boron, cesium, didymium, lanthanum, potassium, sodium, tantalum, titanium, tungsten and zinc. Preferably compounds of these metals are used which belong to the class of beta-diketone derivatives, which have the following structural formulas: R—CO—CHR₁₁, wherein R and R₁₁ are hydrocarbon radicals which may also carry halogen atoms as substituents, and R₁ is such a hydrocarbon radical or a hydrogen atom.

In the case of arsenic, antimony, bismuth and boron, none of which forms sufficiently stable beta diketone compounds to be satisfactory for use in motor fuels, other compounds of these elements may be employed, such as:

Arsenic tri-amyl, tri-phenylarsine, butyl-arsonic acid.
Antimony tri-amyl, tri-phenyl-stibine, tri-ethyl-stibine.
Bismuth tri-amyl, tri-ethyl-bismuthine.
Boron tri-amyl, tri-iso-butyl borate.

While we have found that the addition to a base fuel of organic derivatives of any one of the metals and metalloids above enumerated will result in some improvement in the combustion efficiency, we prefer to employ admixtures of several metal organic derivatives. Combinations of various of the different metal compounds produce unexpectedly improved results not attainable in full measure by the use of any of the compounds singly.

It will be understood that in selecting any particular metal compound for use in motor fuels in accordance with this invention, due regard will be given to the solubility, stability and availability of such compound. Thus in the event that the beta diketone derivative of a particular metal is not practical for use, some other organic compound from among the phenyl and alkyl compounds or other organic compounds of that metal may be selected.

Without limiting the scope of this invention, the following examples are given to illustrate preferred mixtures of organo-metallic compounds, expressed in parts by weight:

EXAMPLES FOR SPARK-IGNITION ENGINE FUEL

*Example 1*

| | Parts |
|---|---|
| Tetra propyl tin _____ gram__ | .50 |
| Diphenyl di selenide _____ do____ | .47 |
| Didymium propionylacetonate _____ do____ | .01 |
| Tungsten propionylacetonate _____ do____ | .01 |
| Potassium naphthenate _____ do____ | .01 |
| | 1.00 |

*Example 2*

| | |
|---|---|
| Tin propionylacetonate _____ gram__ | .50 |
| Cadmium tetra amyl _____ do____ | .47 |
| Lanthanum propionylacetonate _____ do____ | .01 |
| Tantalum propionylacetonate _____ do____ | .01 |
| Barium propionylacetonate _____ do____ | .01 |
| | 1.00 |

*Example 3*

| | |
|---|---|
| Di phenyl di selenide _____ gram__ | .60 |
| Thallium propionylacetonate _____ do____ | .35 |
| Zinc di amyl _____ do____ | .02 |
| Sodium naphthenate _____ do____ | .01 |
| Didymium propionylacetonate _____ do____ | .02 |
| | 1.00 |

*Example 4*

| | |
|---|---|
| Selenium propionylacetonate _____ gram__ | .60 |
| Cadmium propionylacetonate _____ do____ | .36 |
| Lanthanum propionylacetonate _____ do____ | .02 |
| Tungsten propionylacetonate _____ do____ | .01 |
| Boron tri amyl _____ do____ | .01 |
| | 1.00 |

EXAMPLES FOR COMPRESSION-IGNITION ENGINE FUEL

*Example 1*

| | Parts |
|---|---|
| Tantalum propionylacetonate _____ gram__ | .30 |
| Didymium propionylacetonate _____ do____ | .30 |
| Tungsten propionylacetonate _____ do____ | .30 |
| Tin propionylacetonate _____ do____ | .05 |
| Di phenyl di selenide _____ do____ | .03 |
| Cadmium tetra amyl _____ do____ | .02 |
| | 1.00 |

*Example 2*

| | |
|---|---|
| Boron tri amyl _____ gram__ | .20 |
| Tantalum propionylacetonate _____ do____ | .30 |
| Lanthanum propionylacetonate _____ do____ | .40 |
| Tin tetra propyl _____ do____ | .04 |
| Antimony propionylacetonate _____ do____ | .06 |
| | 1.00 |

As previously stated, the concentrations of organo-metallic compounds in the base fuel may be varied between 0.001 and 0.085% by weight. If more than 0.075 to 0.085% of the compound is used, the excess is largely wasted since no appreciable added efficiency of combustion is obtained over a prolonged period of operation of a motor by the use of such excess. If a relatively rapid building up of catalytically active deposits is required, as in the beginning of the use of our treated motor fuel, the higher concentrations of organo-metallic compounds should be used, say fuels containing from 0.04 to 0.075% of such compounds. The lower concentrations, namely, from 0.001 to 0.04% are not effective in improving the combustion efficiency of the fuel charge with which such compounds are introduced into the motor, but upon prolonged use become so, due to the building up of the aforementioned catalytically active deposits in the combustion chamber.

We have found from extensive runs that the use of a treated fuel containing about 0.01% of the organo-metallic compounds is ordinarily sufficient, once the requisite amount of catalytically active deposits has been built up, to perpetuate that amount of deposits by replacement of losses therefrom occasioned by factors and conditions normal to the operation of the engine.

For economic reasons, it is preferable to forego the benefit of immediate improvement in motor performance, as could be realized by the use of higher concentrations of organo-metallic compounds, and be content to obtain an ultimate benefit by the use of concentrations so small that, by themselves, they have no improving effect upon the combustion of the fuel charges with which such concentrations are immediately associated upon introduction into the motor.

It will be understood that although specific organo-metallic compounds, and mixtures thereof, have been given herein, the method of this invention contemplates the use of any organo compound of the metals and metalloids above named capable of leaving catalytically active deposits or residues in the intake passages or in the combustion chamber that are effective in improving the combustion efficiency of the base fuel and that may be perpetuated by replacement and augmentation during continued use in the motor of a base fuel treated with such compound, or similar compounds.

In all of our experiments and demonstrations, using our treated fuels, in order to get back to accurate readings on the performance of untreated fuels, it was found imperative to thoroughly clean and remove from the motor all traces of catalytic deposits previously formed.

Optimum concentrations of the catalytic metal compounds in the fuel will vary within the above stated limits, depending upon the grade and character of the fuel to be treated and upon the compression ratio of the motors in which the treated fuel is to be used.

The metal derivatives of the beta-diketones may be used singly, or compounds of two or more metals may be mixed together and so constitute the total catalytic concentration in the fuel. Likewise, two or more separate compounds of the same metal may be used.

Where the base fuel already contains tetraethyl lead, or other volatile lead compound, the addition to such fuel of one or more beta-diketone derivatives such as here described further improves the efficiency of combustion of the fuel. Also, the presence of the catalytically active deposits, formed in the manner described, results in an improved combustion of fuel that contains tetraethyl lead.

In the use of gasolines treated with tetraethyl lead, it is the vapors of the tetraethyl lead formed in the combustion chamber that are effective in suppressing knock. We find that the vapors of tetraethyl lead so formed retain their knock suppressing function in the presence of the catalytic deposits which are formed in carrying out the method of this invention.

In addition to such improvement of combustion so provided by the vapors of tetraethyl lead, we find an added improvement in combustion efficiency when the fuel containing tetraethyl lead is burned in the presence of the catalytic deposits. The catalytic deposits appear to function separately, as a secondary acting agent, in further controlling and improving the efficiency of the combustion process. The improved combustion obtained by the presence of said catalytic deposits is additive to the function provided by tetraethyl lead. This invention therefore includes the use of a fuel, in accordance with the method herein described, that contains fom 0.1 cc. to 5 cc. of tetraethyl lead.

"Improved efficiency of combustion", as the term is used herein, is evidenced by a decreased knock; by an acceleration of the rate of total combustion; by a more uniform rate of combustion for the various hydrocarbon components of the fuel and oxidation products thereof; by a greater smoothness in the operation of the motor; by an increase in speed and power of the motor; by a decrease in fuel consumption for a given power output or mileage; by a diminished accumulation of carbon deposits, or an improvement in the character of carbon deposits, such for instance as decreased proportion of hard carbon in the deposits; and/or by the permitting of the use of a leaner mixture of fuel in the charge.

We are aware that numerous details of the process may be varied through a wide range without departing from the principles of this invention, and we, therefore, do not purpose limiting the patent granted hereon otherwise than necessitated by the prior art.

We claim as our invention:

1. The method of operating an internal combustion engine to improve the efficiency thereof which comprises introducing into a combustion chamber of said engine a fuel charge containing a relatively small concentration of an organo-metallic compound and burning said charge therein, the concentration of said organo-metallic compound being so small as to have in itself no substantial improving effect upon the combustion of the fuel with which said compound is immediately associated but being capable of forming a catalytic deposit within said combustion chamber effective by augmentation during continued operation of said engine with a like fuel charge to increase the efficiency of combustion within said engine, the metal of said organo-metallic compound being selected from the group consisting of selenium, antimony, arsenic, bismuth, cadmium, tellurium, thallium, tin, barium, boron, cesium, didymium, lanthanum, potassium, sodium, tantalum, titanium, tungsten and zinc.

2. The method as defined by claim 1, wherein the organo-metallic compound is a beta-diketone of said metal.

3. The method as defined by claim 1, wherein the organo-metallic compound is a tin beta-diketone.

4. The method as defined by claim 1, wherein the organo-metallic compound is a selenium beta-diketone.

5. The method as defined by claim 1, wherein the organo-metallic compound is a didymium beta-diketone.

6. The method as defined by claim 1, wherein the organo-metallic compound is tin propionylacetonate.

7. The method as defined by claim 1, wherein the organo-metallic compound is selenium propionylacetonate.

8. The method as defined by claim 1, wherein the organo-metallic compound is didymium propionylacetonate.

9. The method as defined by claim 1, wherein the concentration of said compound in said motor fuel is of the order of less than 0.085% by weight of said fuel.

10. The method of enhancing the combustion efficiency of a motor fuel, which comprises stably incorporating into a gasoline motor fuel a substance in a concentration insufficient in itself to appreciably affect the combustible properties of the containing charge, a residue of said substance upon combustion of said fuel being deposited upon surfaces of the combustion chamber in a condition operatively capable ultimately of exerting a catalytic effect sufficient to improve the combustion efficiency of succeeding fuel charges in said combustion chamber, said substance being an organo-compound of a metal selected from the group consisting of selenium, antimony, arsenic, bismuth, cadmium, tellurium, thallium, tin, barium, boron, cesium, didymium, lanthanum, potassium, sodium, tantalum, titanium, tungsten and zinc.

11. The method as defined by claim 10, wherein the organo-metallic compound is a beta-diketone of said metal.

12. The method as defined by claim 10, wherein the concentration of said substance in said gasoline motor fuel is from 0.001 to 0.04% by weight of said fuel.

13. The method as defined by claim 10, wherein the normal anti-knock value of the gasoline motor fuel has been improved by the addition thereto of a volatile lead alkyl compound.

14. The method of utilizing a relatively low compression motor fuel to improve the combustion efficiency thereof in a motor of at least 7.5 to 1 compression ratio, which comprises forming a combustible mixture of said fuel and air, subjecting said mixture to a compression of at least 7.5 to 1 in the presence of a suspended organo-metallic compound the concentration of which in said mixture is so small as to have of itself no substantial improving effect upon the combustion of said fuel in said immediate mixture, and burning said mixture in the presence of catalytically active deposits resulting from the burning of preceding mixtures containing an organo-metallic compound, the metal of said organo-metallic compound being selected from a group consisting of selenium, antimony, arsenic, bismuth, cadmium, tellurium, thallium, tin, barium, boron, cesium, didymium, lanthanum, potassium, sodium, tantalum, titanium, tungsten and zinc.

15. The method of conditioning a combustion chamber by depositing therein a catalyst capable after substantial amounts thereof have been deposited of enhancing the combustion efficiency of any gasoline motor fuel, which comprises burning in said chamber a gasoline motor fuel containing from 0.001 to 0.04% by weight of a beta-diketone of a metal selected from the group consisting of selenium, antimony, arsenic, bismuth, cadmium, tellurium, thallium, tin, barium, boron, cesium, didymium, lanthanum, potassium, sodium, tantalum, titanium, tungsten and zinc.

16. A motor fuel containing a metal beta-diketone compound capable upon combustion of said fuel of depositing a catalytically active residue, the amount of said compund and of said residue formed directly therefrom being so small as to have of itself substantially no improving effect upon the combustible properties of the containing charge but operatively capable of enhancing the combustion efficiency of said fuel as said residue is augmented by other similar residues formed upon combustion of other similar fuel charges, the metal of said metal beta-diketone compound being selected from the group consisting of selenium, antimony, arsenic, bismuth, cadmium, tellurium, thallium, tin, barium, boron, cesium, didymium, lanthanum, potassium, sodium, tantalum, titanium, tungsten and zinc.

17. A motor fuel as defined by claim 16, wherein the organo-metallic compound is a tin beta-diketone.

18. A motor fuel as defined by claim 16, wherein the organo-metallic compound is a selenium beta-diketone.

19. A motor fuel as defined by claim 16, wherein the organo-metallic compound is a didymium beta-diketone.

20. A motor fuel as defined by claim 16, wherein the organo-metallic compound is tin propionylacetonate.

21. A motor fuel as defined by claim 16, wherein the organo-metallic compound is selenium propionylacetonate.

22. A motor fuel as defined by claim 16, wherein the organo-metallic compound is didymium propionylacetonate.

23. A motor fuel as defined by claim 16, wherein said fuel comprises gasoline and the concentration of said organo-metallic compound contained therein is of the order of less than 0.085% by weight of said gasoline fuel.

24. A motor fuel as defined by claim 16, wherein said fuel comprises gasoline and concentration of said organo-metallic substance contained therein is from 0.001 to 0.045 by weight of said gasoline motor fuel.

25. A motor fuel as defined by claim 16, wherein the fuel comprises gasoline, the normal antiknock value of which has been improved by the addition thereto of a volatile lead alkyl compound.

WILLARD E. LYONS.
LEO J. McKONE.